US009812923B2

(12) United States Patent
Searfoss

(10) Patent No.: US 9,812,923 B2
(45) Date of Patent: Nov. 7, 2017

(54) GEAR MOTOR

(71) Applicant: Aero Industries, Inc., Indianapolis, IN (US)

(72) Inventor: Timothy K. Searfoss, West Branch, MI (US)

(73) Assignee: Aero Industries, Inc., Indianapolis, IN (US)

(*) Notice: Subject to any disclaimer, the term of this patent is extended or adjusted under 35 U.S.C. 154(b) by 251 days.

(21) Appl. No.: 14/562,185

(22) Filed: Dec. 5, 2014

(65) Prior Publication Data

US 2015/0340926 A1    Nov. 26, 2015

Related U.S. Application Data

(60) Provisional application No. 62/002,641, filed on May 23, 2014.

(51) Int. Cl.
| | |
|---|---|
| *H02K 7/06* | (2006.01) |
| *H02K 7/116* | (2006.01) |
| *F16H 1/20* | (2006.01) |
| *F16H 1/26* | (2006.01) |
| *F16H 1/14* | (2006.01) |

(52) U.S. Cl.
CPC .............. *H02K 7/116* (2013.01); *F16H 1/20* (2013.01); *F16H 1/203* (2013.01); *F16H 1/26* (2013.01); *F16H 1/145* (2013.01)

(58) Field of Classification Search
CPC .. H02K 7/16; F16H 1/20; F16H 1/145; F16H 1/203; F16H 1/26
USPC .......................................................... 310/83
See application file for complete search history.

(56) References Cited

U.S. PATENT DOCUMENTS

| | | |
|---|---|---|
| 4,084,756 A | 4/1978 | Coxhill |
| 4,148,262 A | 4/1979 | Eichinger |
| 4,260,918 A * | 4/1981 | Engle ..................... H02K 5/132 |
| | | 310/68 B |
| 4,608,875 A | 9/1986 | Wallace |
| 4,742,722 A | 5/1988 | Wallace |
| 5,079,877 A | 1/1992 | Abysov et al. |
| 5,307,705 A | 5/1994 | Fenelon |
| 5,452,622 A | 9/1995 | Fenelon |
| 5,704,248 A | 1/1998 | Knotts |
| 5,782,133 A | 7/1998 | Kullborg |
| 6,074,322 A | 6/2000 | Fleytman |
| 6,155,376 A | 12/2000 | Cheng |
| 6,325,738 B1 | 12/2001 | Caringella et al. |
| 6,464,032 B1 * | 10/2002 | Fleytman .................. F16H 1/16 |
| | | 180/245 |

(Continued)

FOREIGN PATENT DOCUMENTS

WO    WO9919095 A2    4/1999

OTHER PUBLICATIONS

Self-Locking Gears: Design and Potential Applications, AGMA Technical Paper, Kapelevich et al., Oct. 2010.

(Continued)

*Primary Examiner* — Hanh Nguyen
(74) *Attorney, Agent, or Firm* — Maginot, Moore & Beck, LLP

(57) ABSTRACT

A gear motor includes an electric motor, a high ratio hypoid ring and pinion coupled to the motor, and one set of spur gears to couple to and work with the spiroid gear set to transfer power to an output shaft.

9 Claims, 23 Drawing Sheets

(56) References Cited

U.S. PATENT DOCUMENTS

| | | | |
|---|---|---|---|
| 6,599,217 B2 | 7/2003 | Caringella et al. | |
| 6,766,708 B2 | 7/2004 | Brooks | |
| 7,374,013 B2 | 5/2008 | Mizuhara et al. | |
| 7,665,380 B2 | 2/2010 | Honda | |
| 7,846,054 B2 | 12/2010 | Schmidt et al. | |
| 7,963,346 B2 | 6/2011 | Brodin | |
| 8,037,957 B2 | 10/2011 | Laurent | |
| 8,061,229 B2 | 11/2011 | Zhuravlev | |
| 8,079,289 B2 | 12/2011 | Schmidt et al. | |
| 8,474,347 B2 | 7/2013 | Brick et al. | |
| 2005/0077790 A1 | 4/2005 | Takechi | |
| 2006/0219036 A1* | 10/2006 | Michioka | F16H 1/145 74/411 |
| 2007/0007055 A1* | 1/2007 | Schmidt | F16H 1/20 180/65.235 |
| 2009/0121568 A1* | 5/2009 | Acosta | F16H 1/203 310/77 |
| 2012/0021863 A1* | 1/2012 | Hirao | F16H 1/145 475/220 |
| 2012/0097779 A1* | 4/2012 | Inoue | A01K 89/01 242/249 |
| 2014/0135168 A1* | 5/2014 | Yokoo | B60K 6/52 477/8 |
| 2014/0318298 A1* | 10/2014 | Inoue | B25J 17/02 74/490.03 |

OTHER PUBLICATIONS

KHK Stock Gears web page, "Q&A about Gears—Section for studying gear technology", 2017.

\* cited by examiner

GEAR MOTOR

CROSS-REFERENCE TO RELATED APPLICATION(S)

This application claims priority to U.S. Provisional Patent Application No. 62/002,641, entitled "Gear Motor," filed on May 23, 2014, which is incorporated herein by reference in its entirety.

FIELD OF THE DISCLOSURE

The present disclosure generally relates to gear motors, and more particularly relates to a high torque direct current gear motor.

BACKGROUND

Gear motors are widely known. Such motors can use alternating current or direct current, and can operate at a range of speeds.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
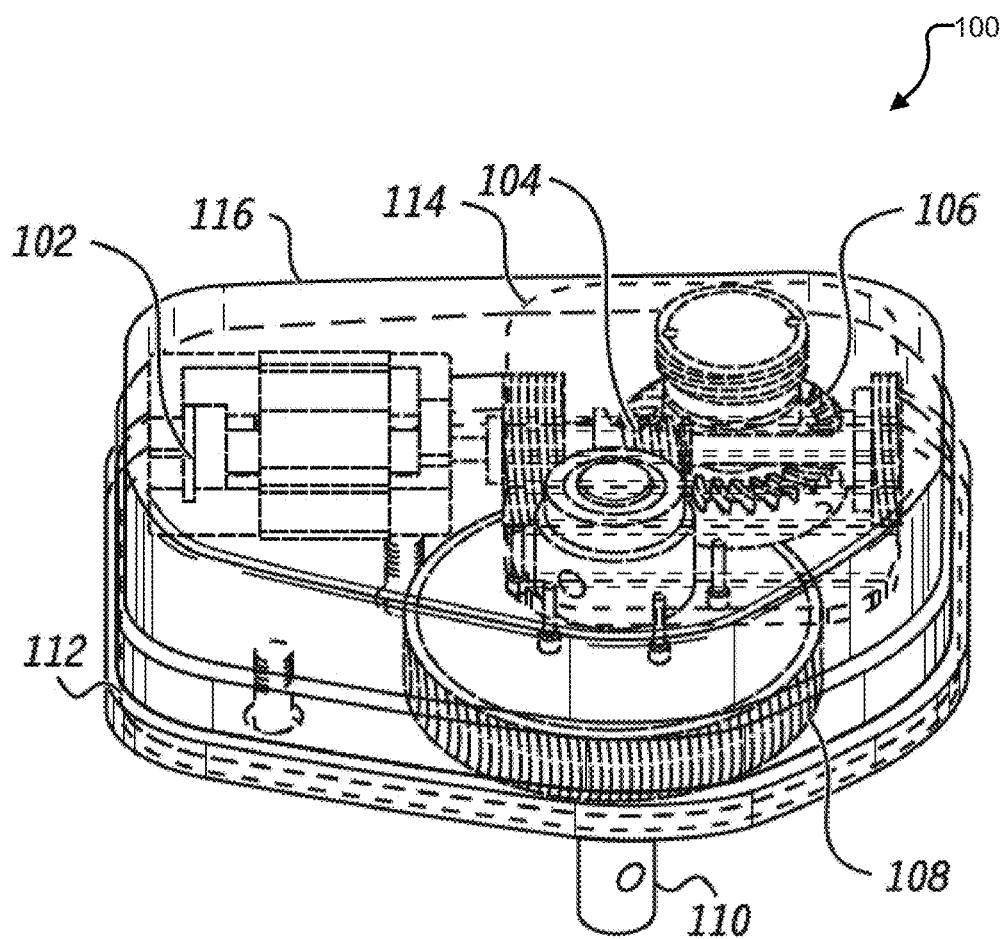
FIGS. 1, 2, and 3 are perspective views of a gear motor, according to embodiments of the present disclosure.
Figure 2:
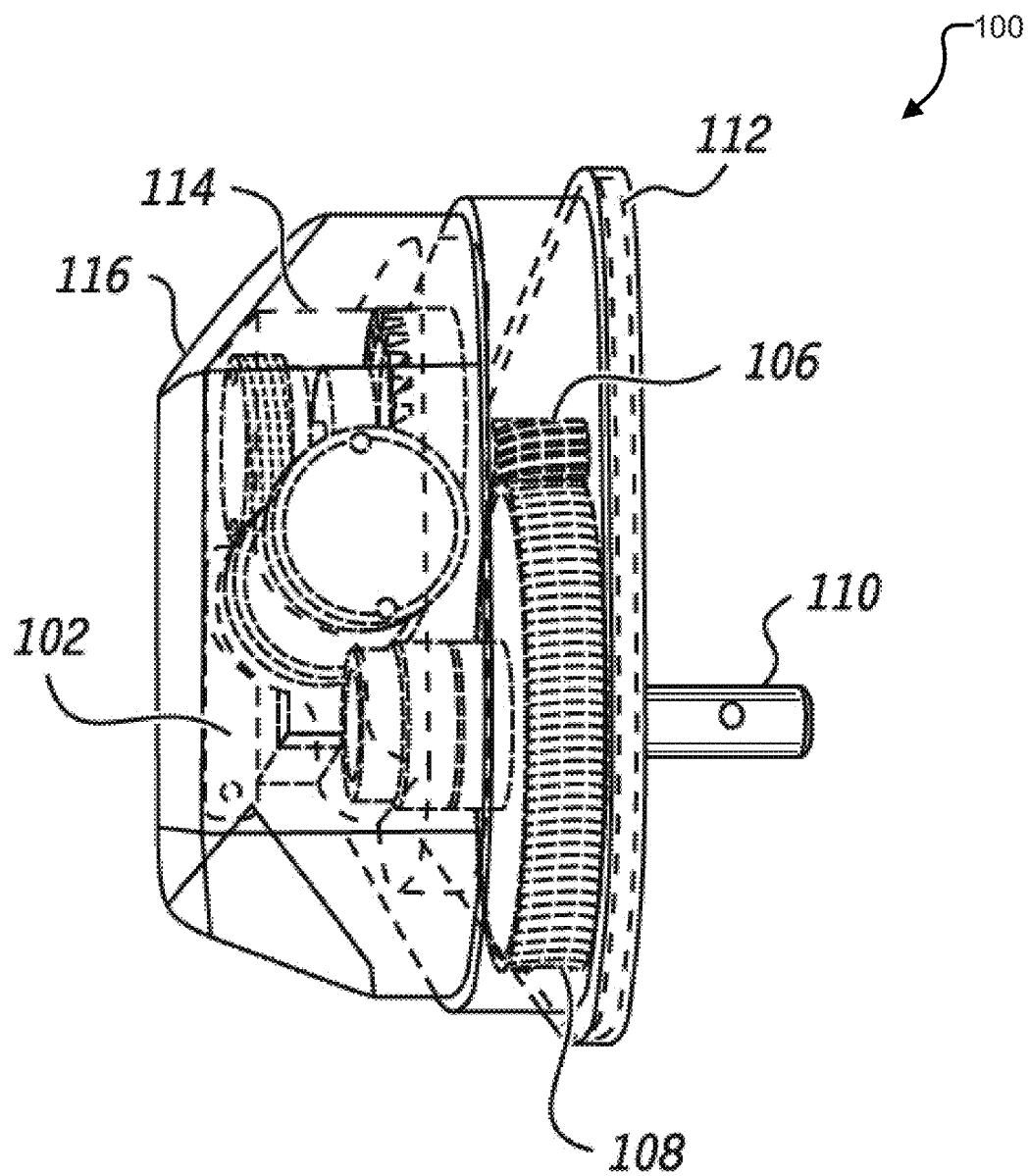
Figure 3:
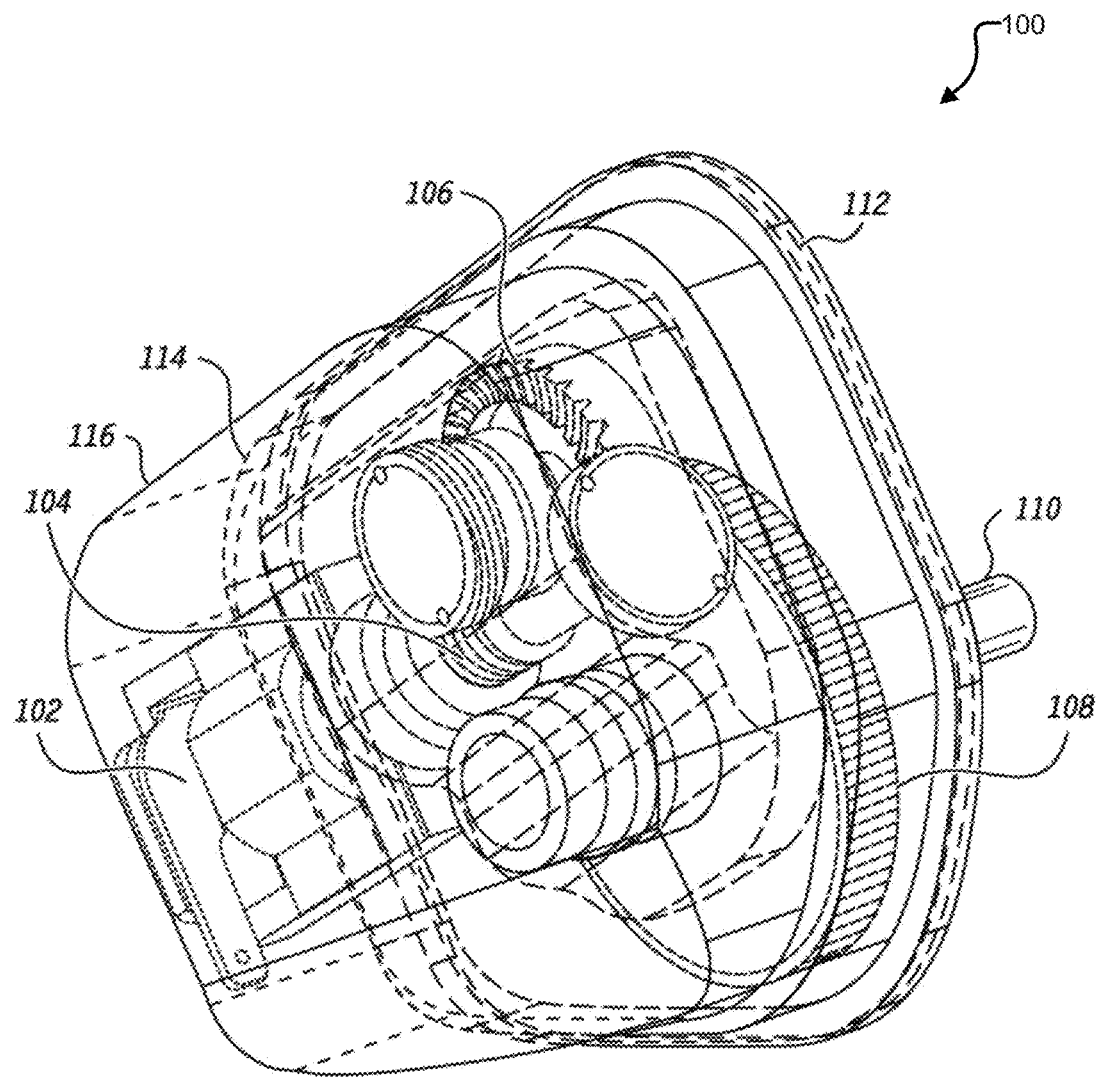

FIGS. 1, 2, and 3 show a gear motor 100 including an electric motor 102, a pinion 104, a ring gear 106, and an output gear 108 coupled to an output shaft 110. In various embodiments, the motor 102 can be a universal motor, and can include stator field coils and rotor windings connected in parallel through a commutator. As such, the motor 1102 can be free of permanent magnets. The motor 102 can be operated using either direct current (DC) or alternating current (AC). The motor 102 is preferably run using DC power.

Gear motor 100 can include a housing plate 112, an internal housing case 114, and an external housing case 116. In various embodiments, internal housing case 114 can form a sealed cavity. Pinion 104 and ring gear 106 can be enclosed by the sealed cavity formed by internal housing case 114. The sealed cavity can be filled with a lubricant such as hypoid oil to inhibit wear of the internal gears. Additionally, external housing case 116 and housing plate 112 can form a second sealed cavity enclosing motor 102, output gear 108, and the sealed cavity with pinion 104 and ring gear 106. The second sealed cavity can protect the motor from dust and water. The electric motor 102 is disposed substantially entirely within the housing.

Figure 4:
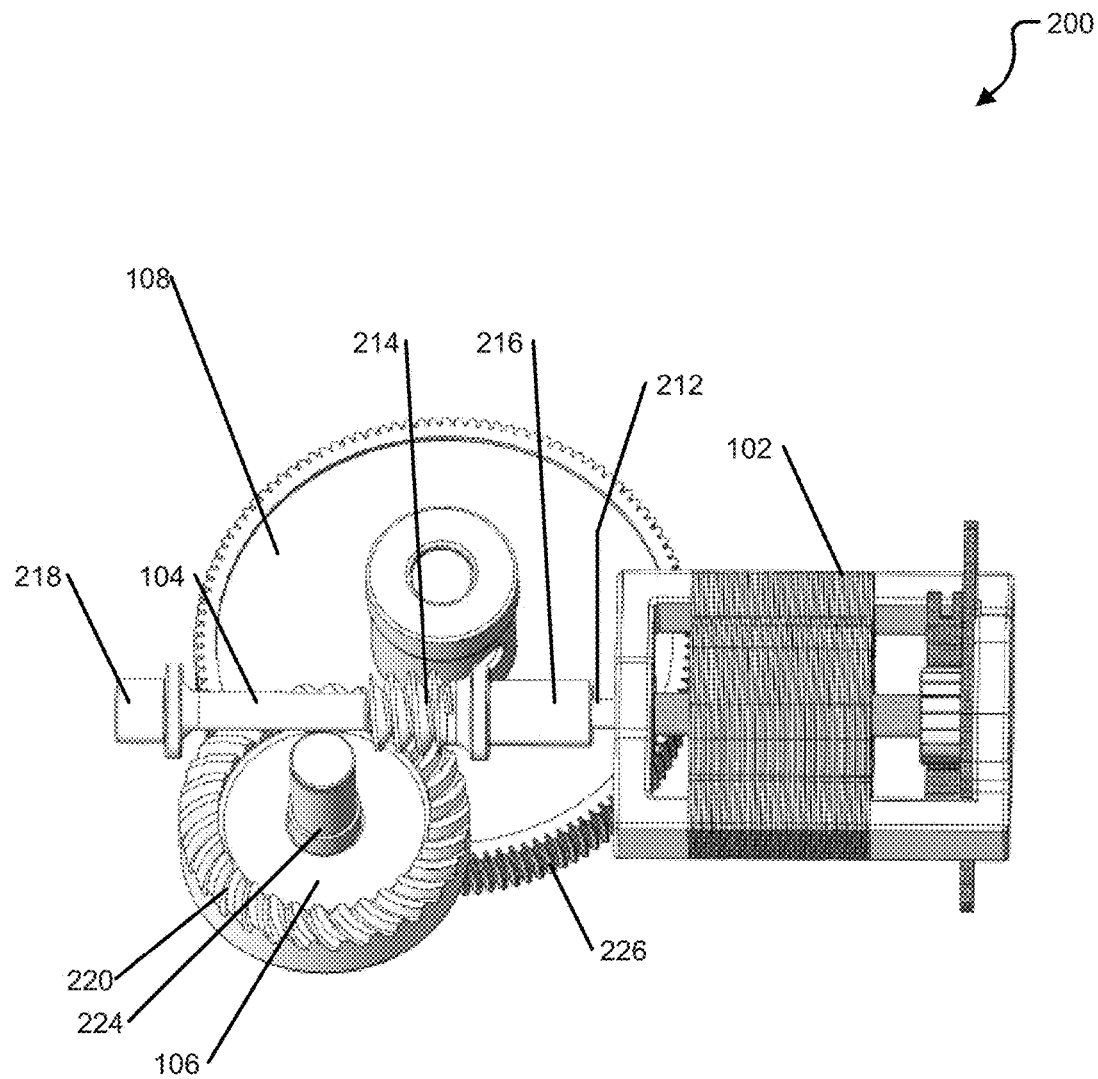
FIGS. 4 through 9 are perspective views showing internal components of the motor, according to embodiments of the present disclosure.
Figure 5:
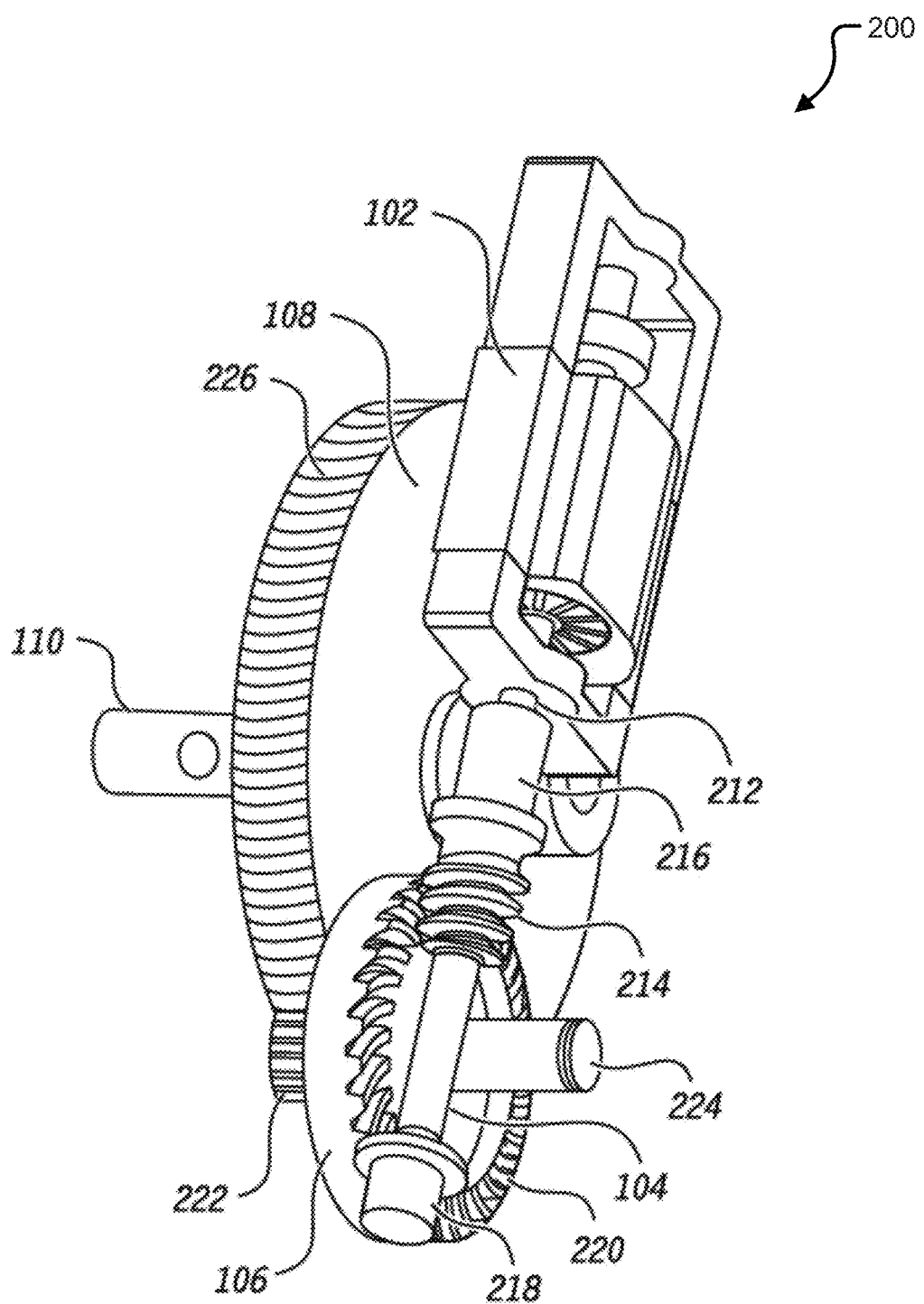
Figure 6:
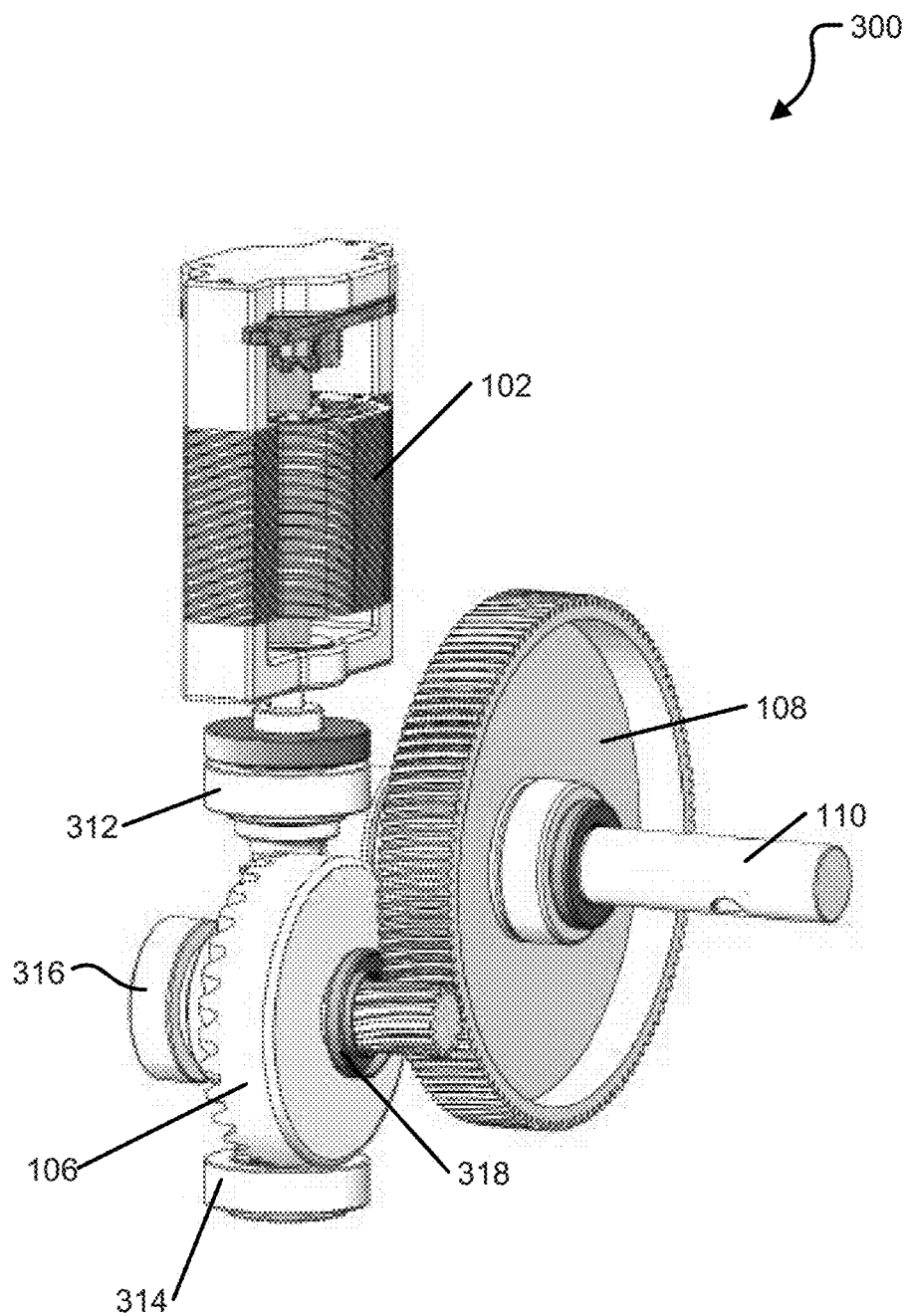
Figure 7:
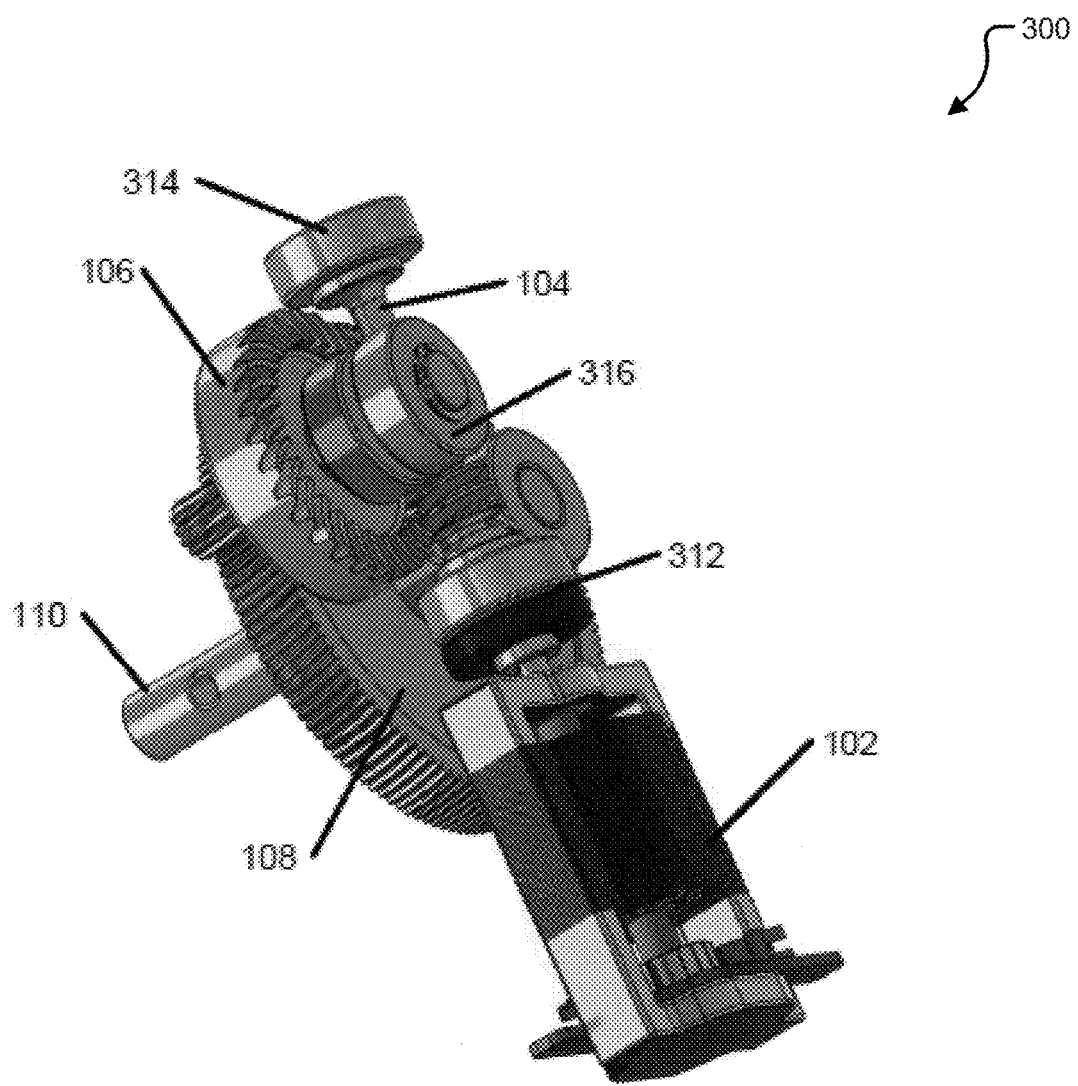
Figure 8:
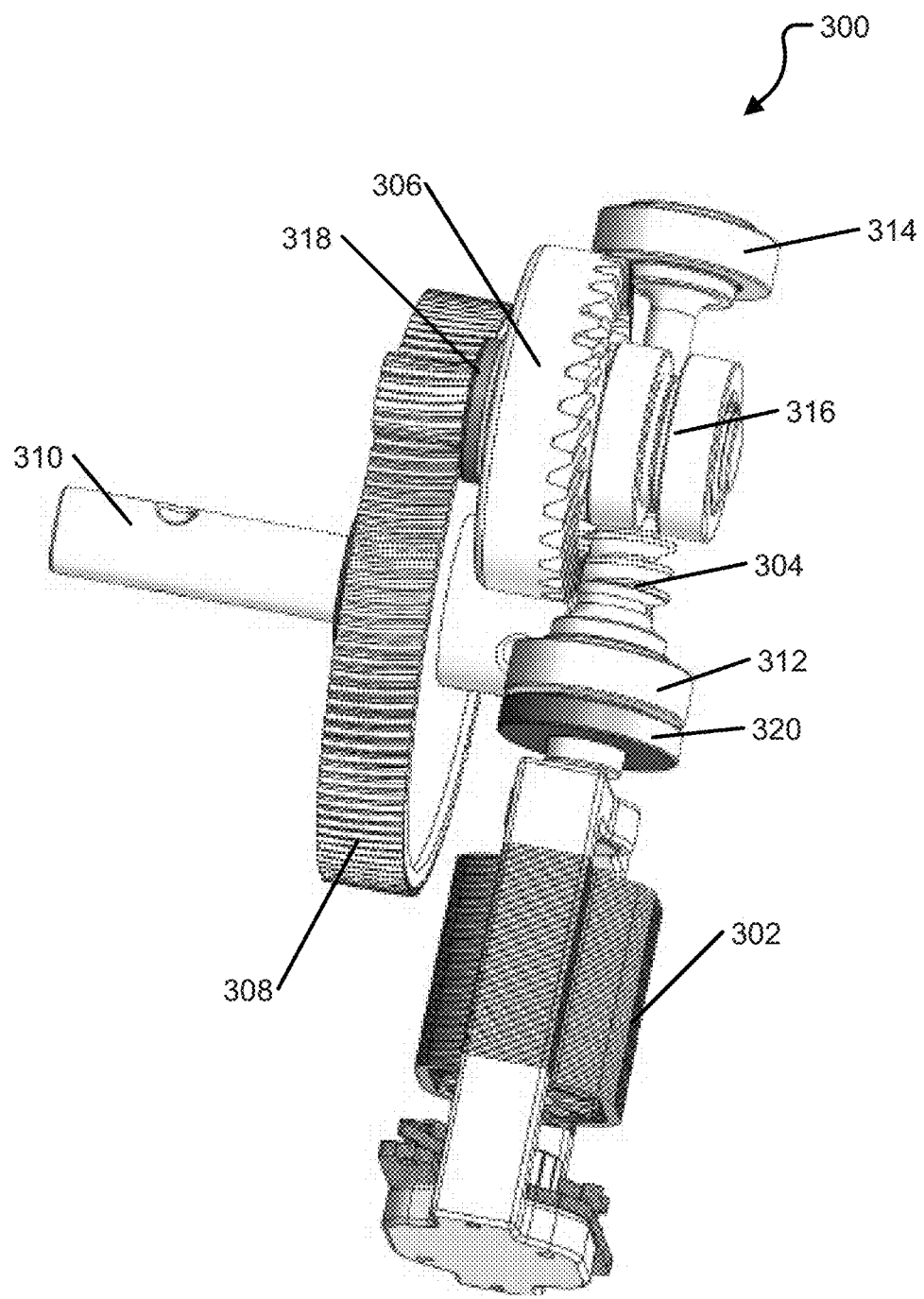
Figure 9:
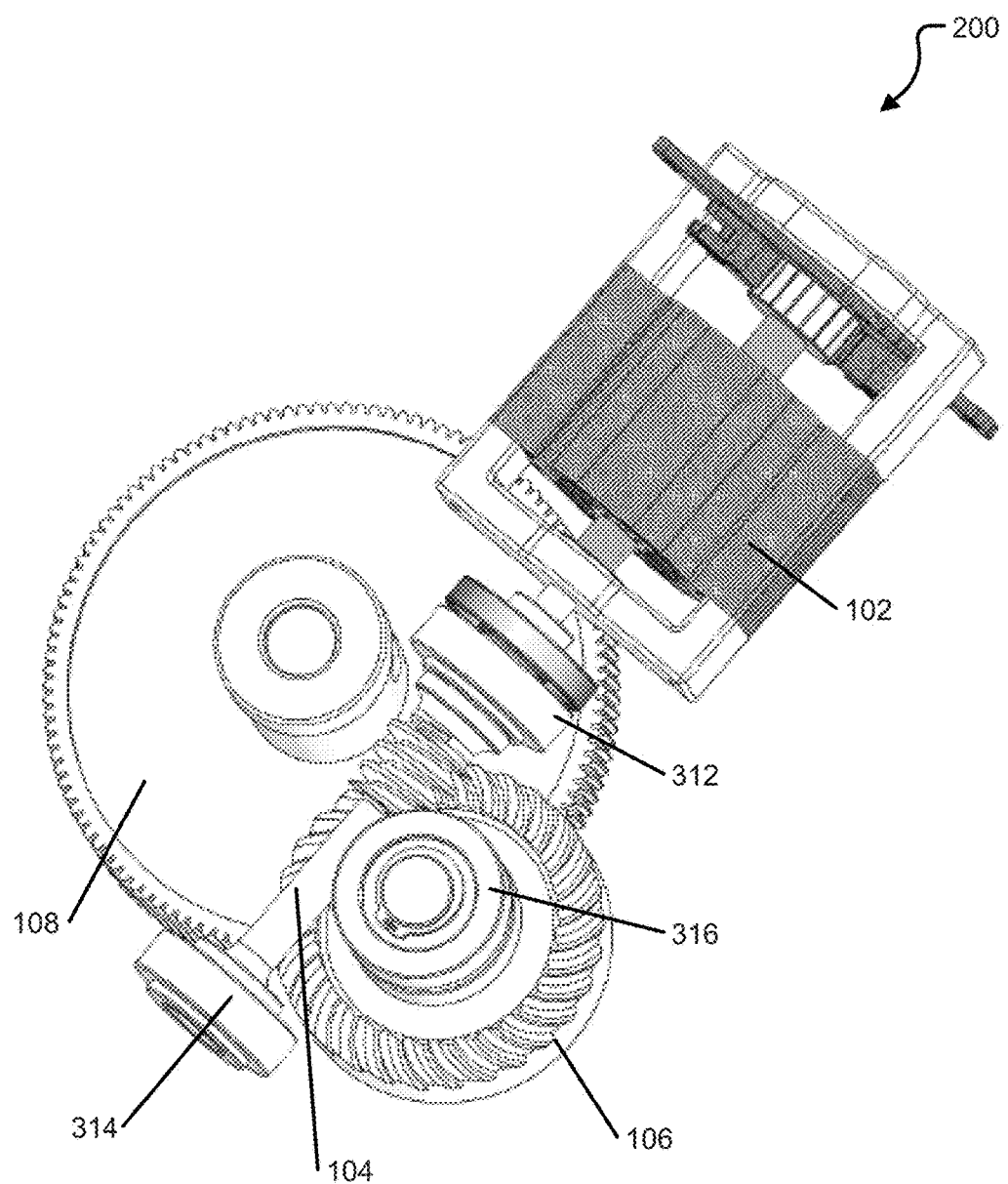
Figure 10:
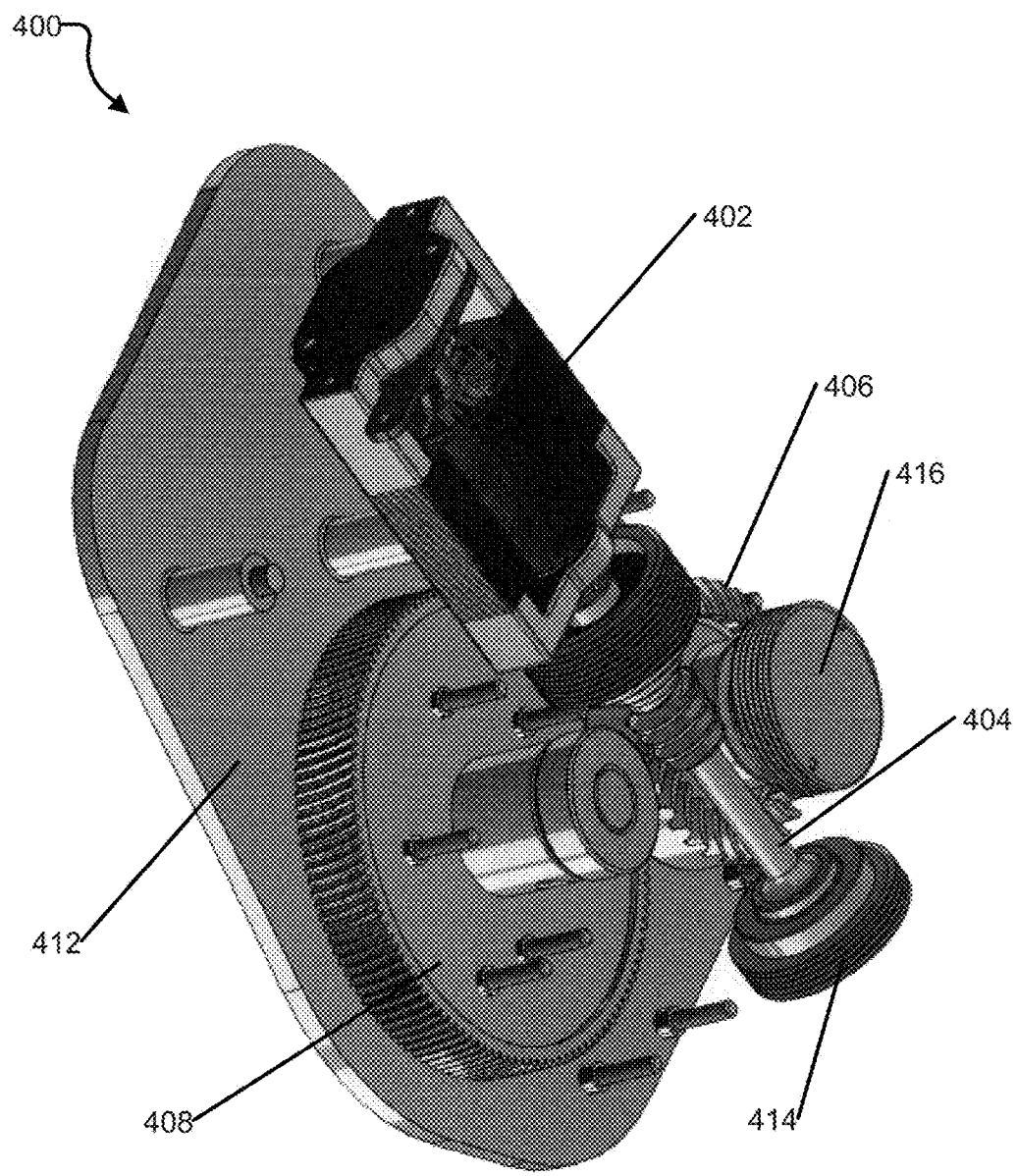
FIG. 10 through 17 are perspective views of a gear motor and gearing system mounted to a plate of a housing, according to embodiments of the present disclosure.
Figure 11:
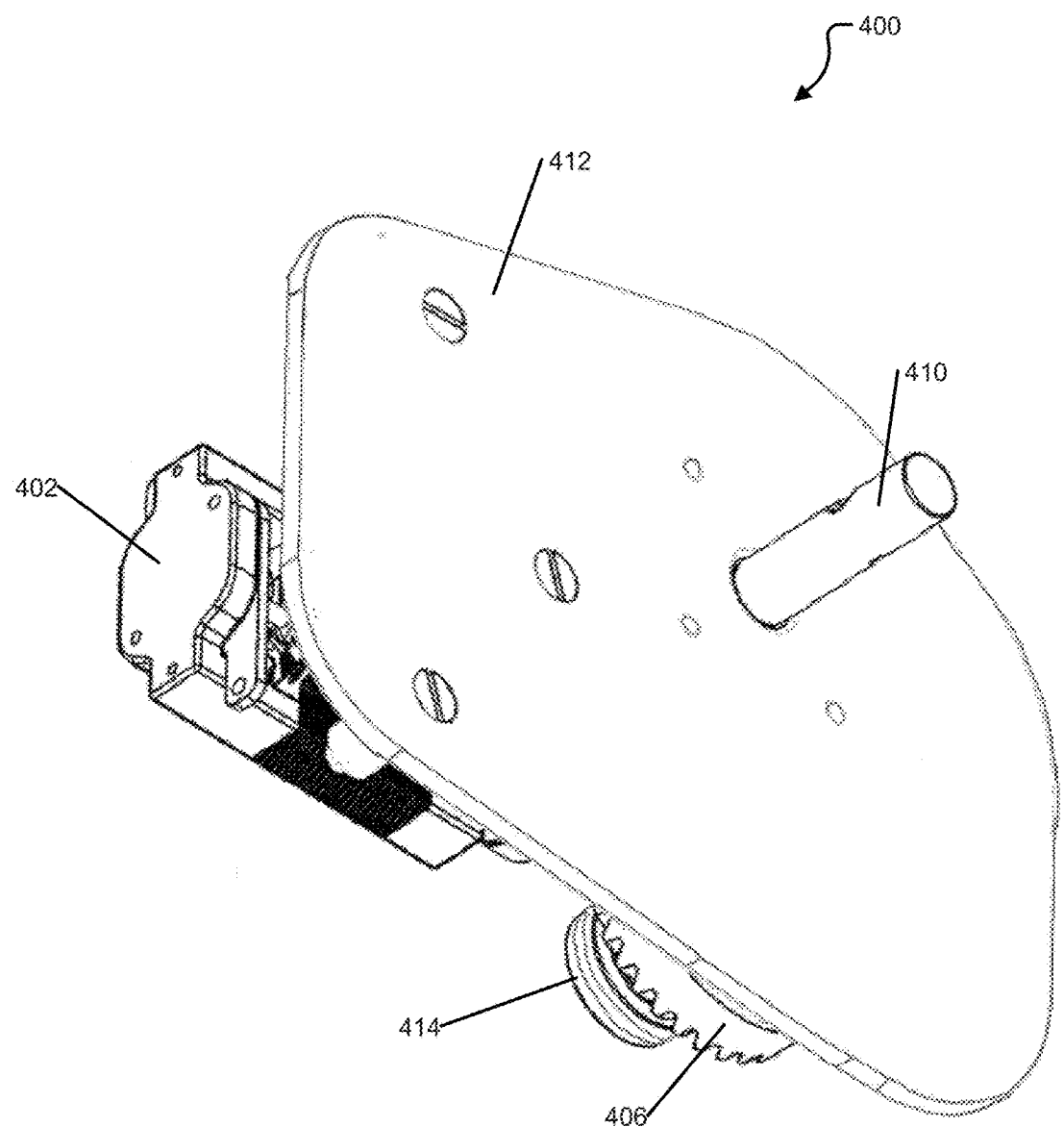
Figure 12:
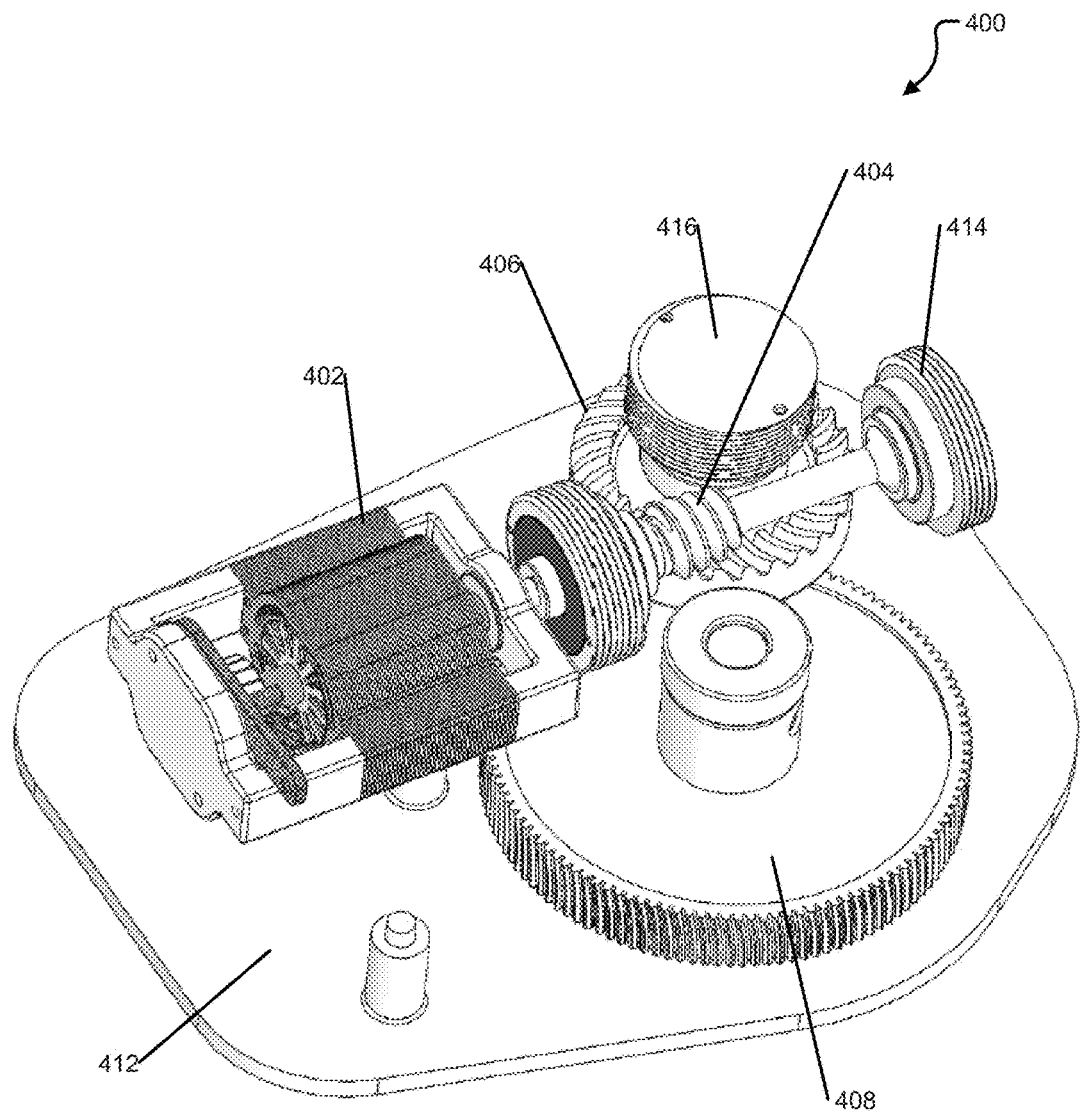
Figure 13:
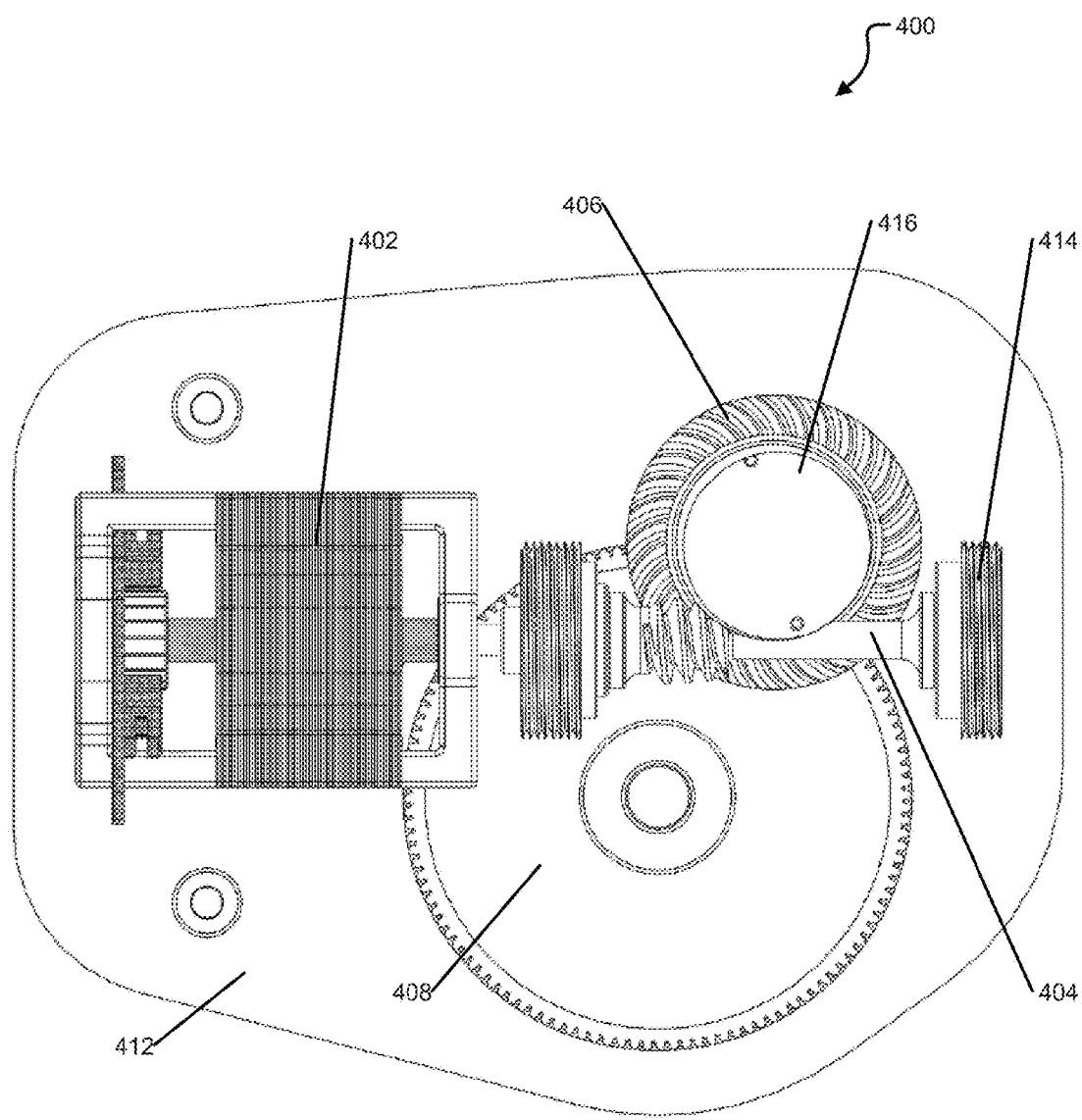
Figure 14:
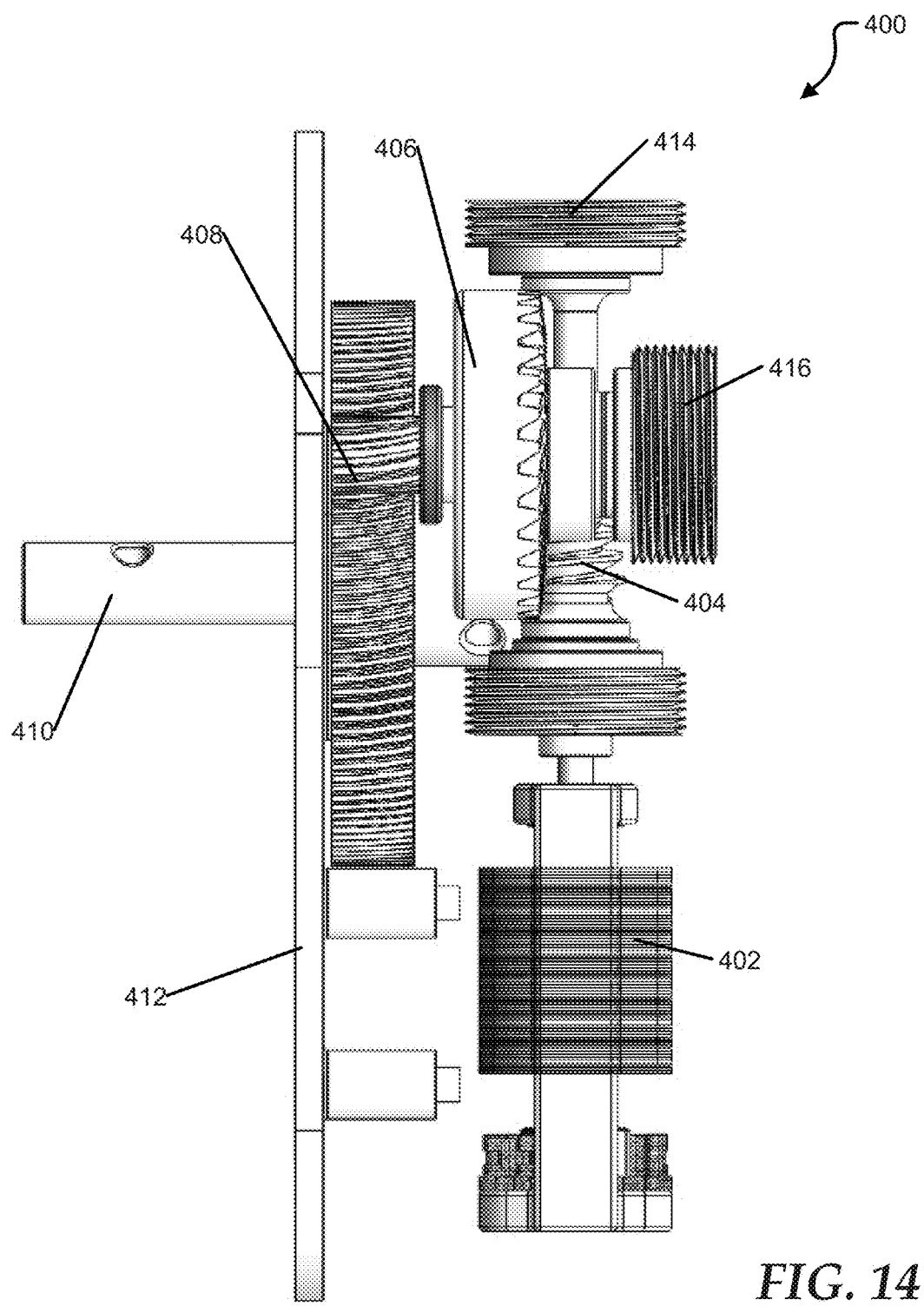
Figure 15:
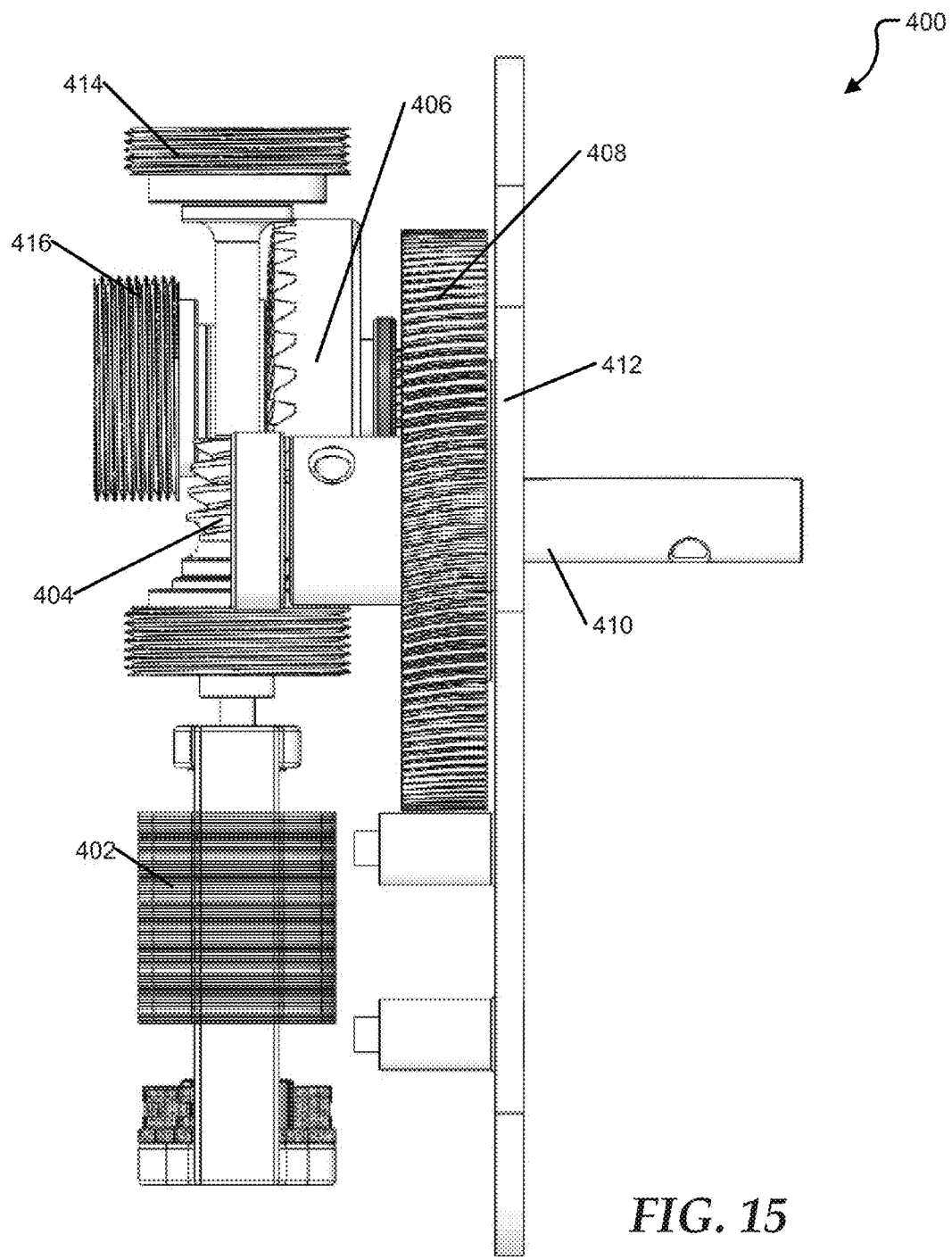
Figure 16:
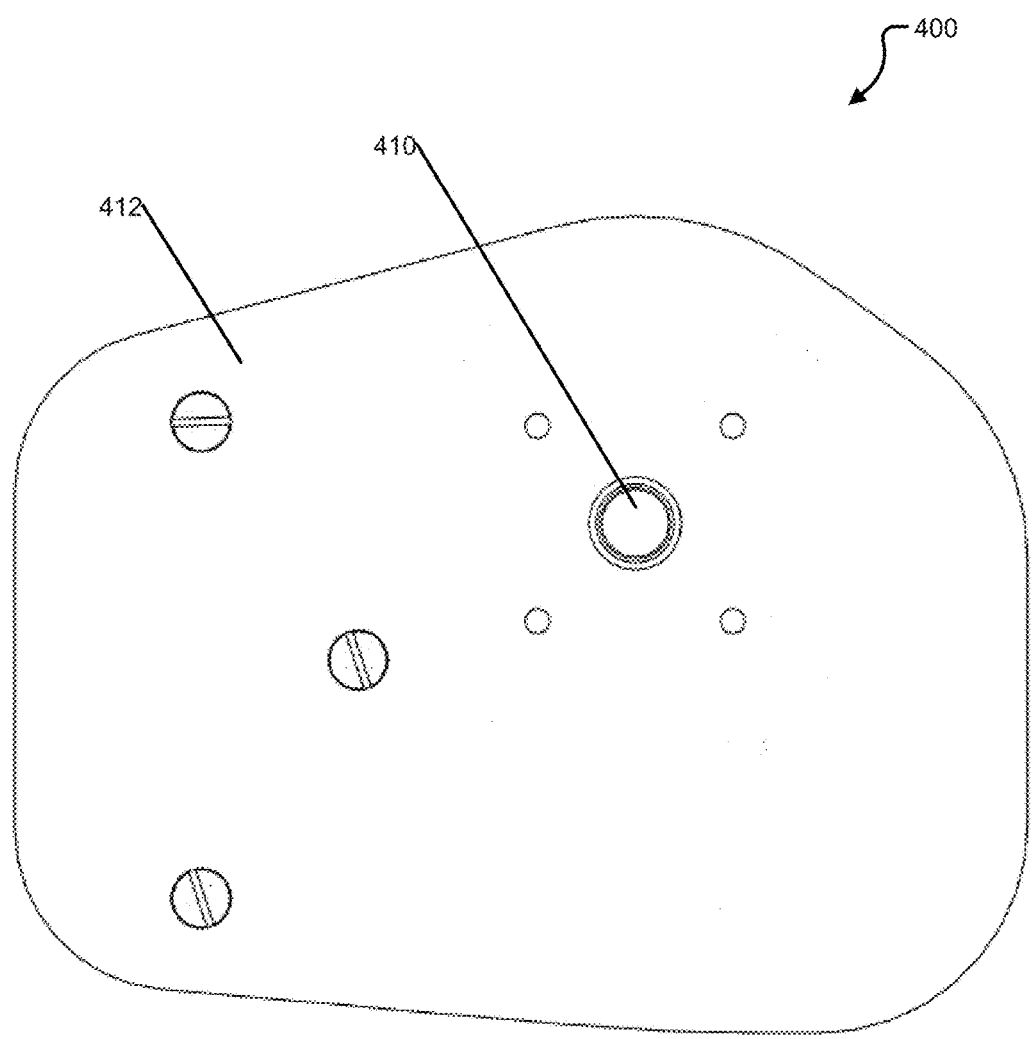
Figure 17:
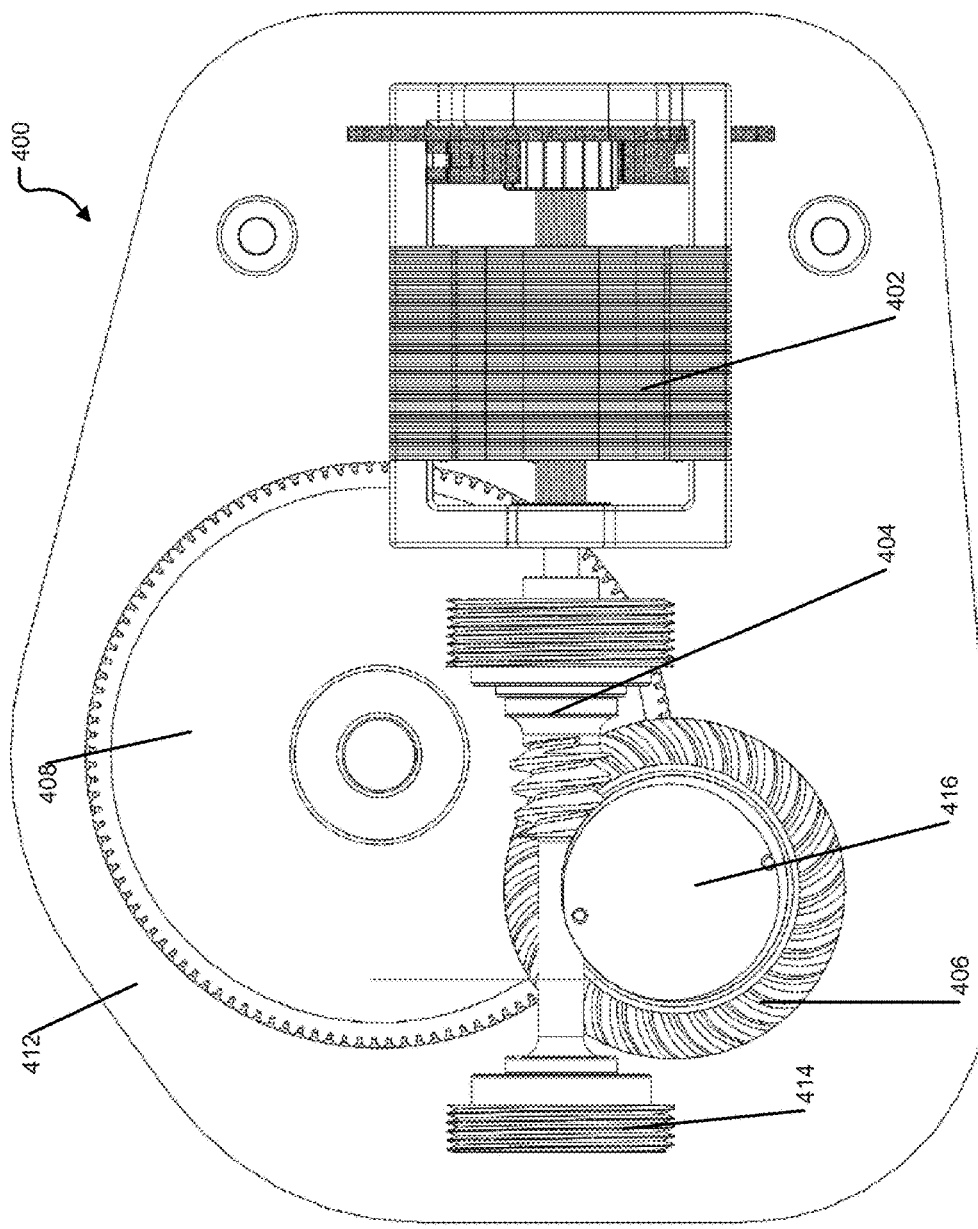

FIGS. 4 and 5 show the internal motor and gear assembly 200. Pinion 104 can be mounted on a shaft 212 of motor 102. Pinion 104 can include hypoid teeth 214, bearing region 216, and bearing region 218. The ring gear 106 can include hypoid gear teeth portion 220. The ring gear 106 is carried by pinion shaft 224 containing bearing region. In various embodiments, a pinion portion 222 can have a spur teeth pattern or a helical spur tooth pattern. Output gear 108 can have a straight or helical toothed edge 226. In various embodiments, pinion 104 and ring gear 106 can be high ratio hypoid gears known as spiroid gears, that self-lock to hold position when the motor is not running. The spiroid gear set has a ratio of 15 to 1 or higher, and preferably of 30 to 1.

Motor 102 can rotate shaft 212 and pinion 104. Rotation of pinion 104 can cause rotation of ring gear 106, which can cause rotation of pinion gear 222 and thus output gear 108, in turn rotating output shaft 110. In various embodiments, motor 102 can be operable in a clockwise or counter-clockwise direction, thereby reversing the direction of rotation of the output shaft 110. Additionally, the spiroid relationship between the pinion 104 and the ring gear 106 can be operable to lock the drive in either direction. Thus when no power is applied to the motor 102, pinion 104 will lock with respect to the ring gear 106, thereby holding the relative positions of the input and output shafts.

FIGS. 6-9 show an alternative embodiment of the motor and gear assembly 300. Pinion bearings 312 and 314 can be coupled to pinion 104. Ring gear bearings 316 can be coupled to ring gear 106. Pinion bearings 312 and 314 and ring gear bearings assembly 316 can operate in conjunction with the internal housing case to maintain the integrity of the sealed cavity while allowing for transfer of rotational motion into and out of the sealed cavity. In various embodiments, pinion bearing 314 can be operable to adjust the positioning of pinion 104 along a pinion axis and ring gear bearing 316 can be operable to adjust the positioning of ring gear 106 along a ring gear axis. Oil seals 318 and 320 are also provided.

FIGS. 10-17 show different views of a motor and gear assembly 400. The motor and gear assembly 400 includes a motor 402, a pinion 404, a ring gear 406, an output gear 408, an output shaft 410, and housing plate 412. Pinion adjuster 414 can be coupled to pinion 404 and be operable to adjust the position of pinion 404 along a pinion axis. Ring gear adjuster 416 can be coupled to ring gear 406 and be operable to adjust the position of ring gear 406 along a ring gear axis. Rotation of the pinion adjuster 414 and/or the ring gear adjustor 416 can be used to make minor adjustments in the relative positioning of pinion 404 and ring gear 406 within the assembled drive system. Such adjustments can optimize contact between the pinion 404 and ring gear 406 to ensure self locking of the mechanism in both directions.

Figure 18:
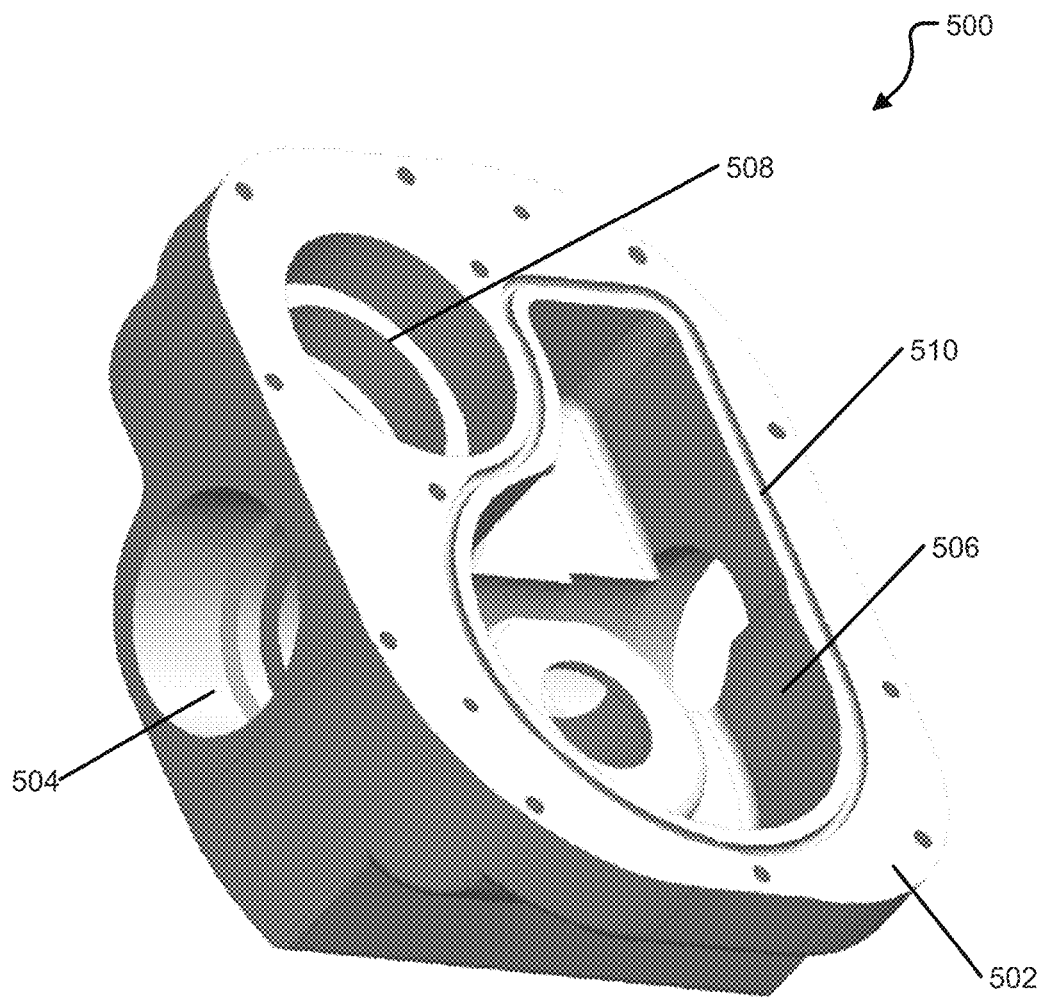
FIGS. 18 and 19 are perspective views of an interior housing cover, according to embodiments of the present disclosure.
Figure 19:
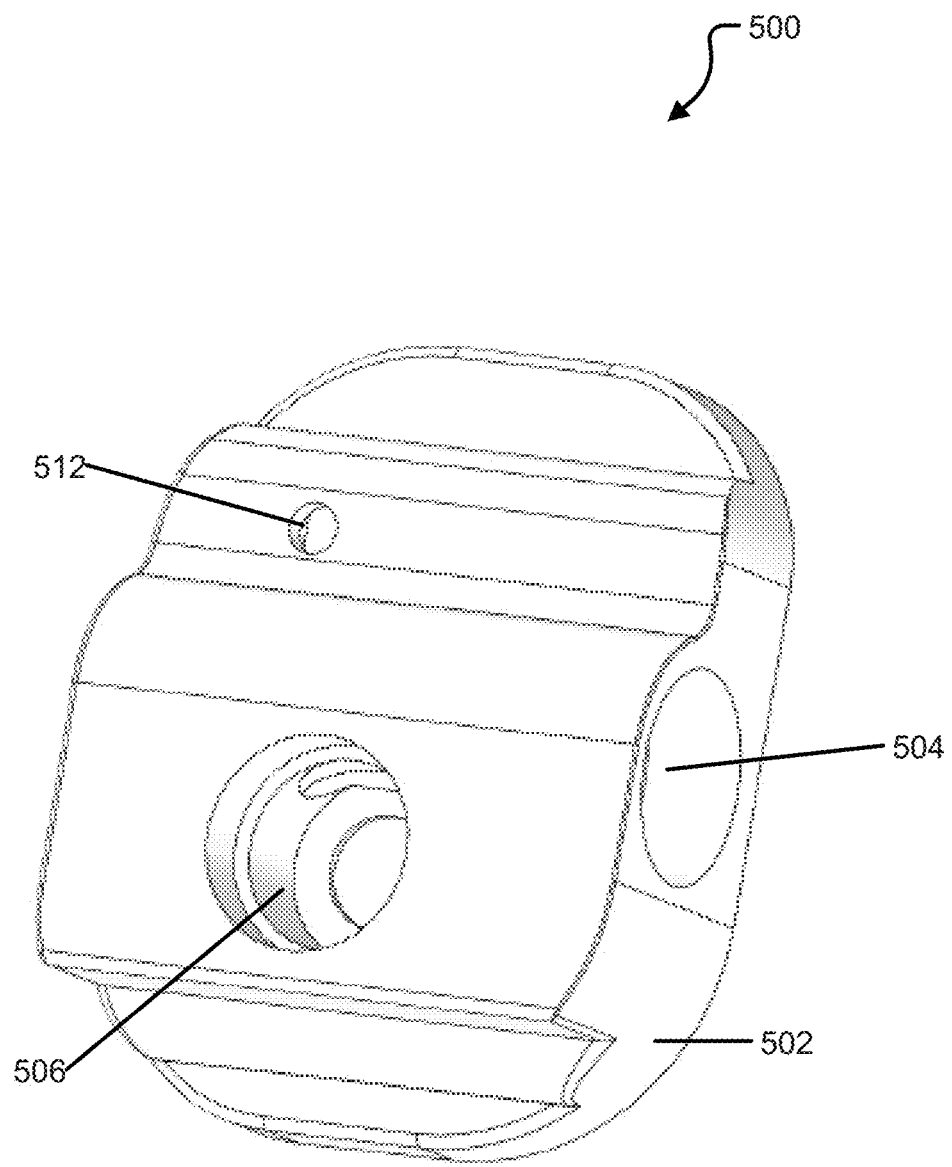

FIGS. 18 and 19 show perspective views of internal housing case 500, including case body 502, bore 504, ring gear cavity 506, output gear shaft cavity 508, seal groove 510, and lubricant port 512. Bore 504, ring gear cavity 506, and lubricant port 512 are connected to form a lubricant filled cavity. When assembled, a pinion shaft is inserted through bore 504, and sealed with threaded spacing adjusters having oil rings such as 414 and 416 discussed above. A ring gear can be inserted into ring gear cavity 506, sealing the circular opening seen in FIG. 19 with a sealed bearing. An output shaft and bearing can be inserted into output gear shaft cavity 508. The output gear shaft cavity 508 can be separated and not in fluid communication with ring gear cavity 506. The opening of ring gear cavity 506 seen in FIG. 18 can be sealed by adding a gasket, such as an o-ring, to seal grove 510 and attaching a sealing plate.

Figure 20:
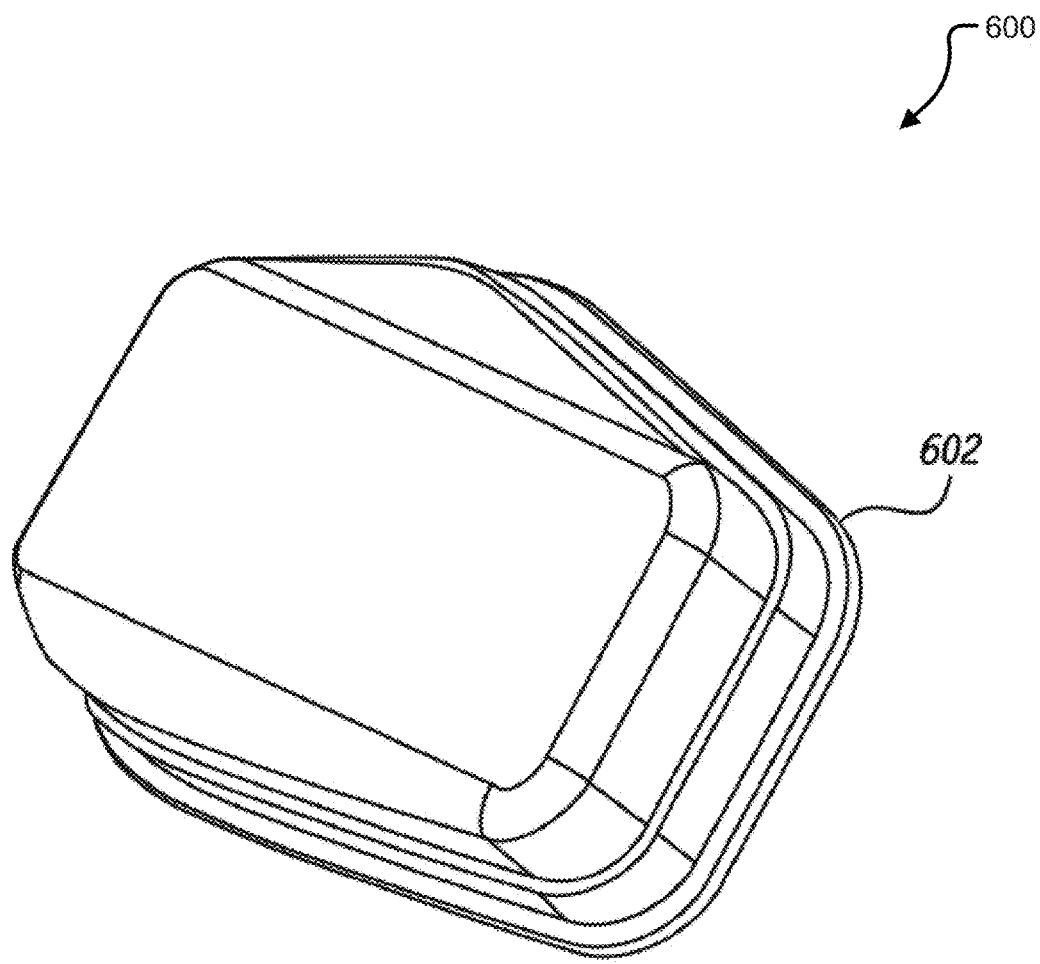
FIGS. 20 and 21 are perspective views of an exterior housing cover, according to embodiments of the present disclosure.
Figure 21:
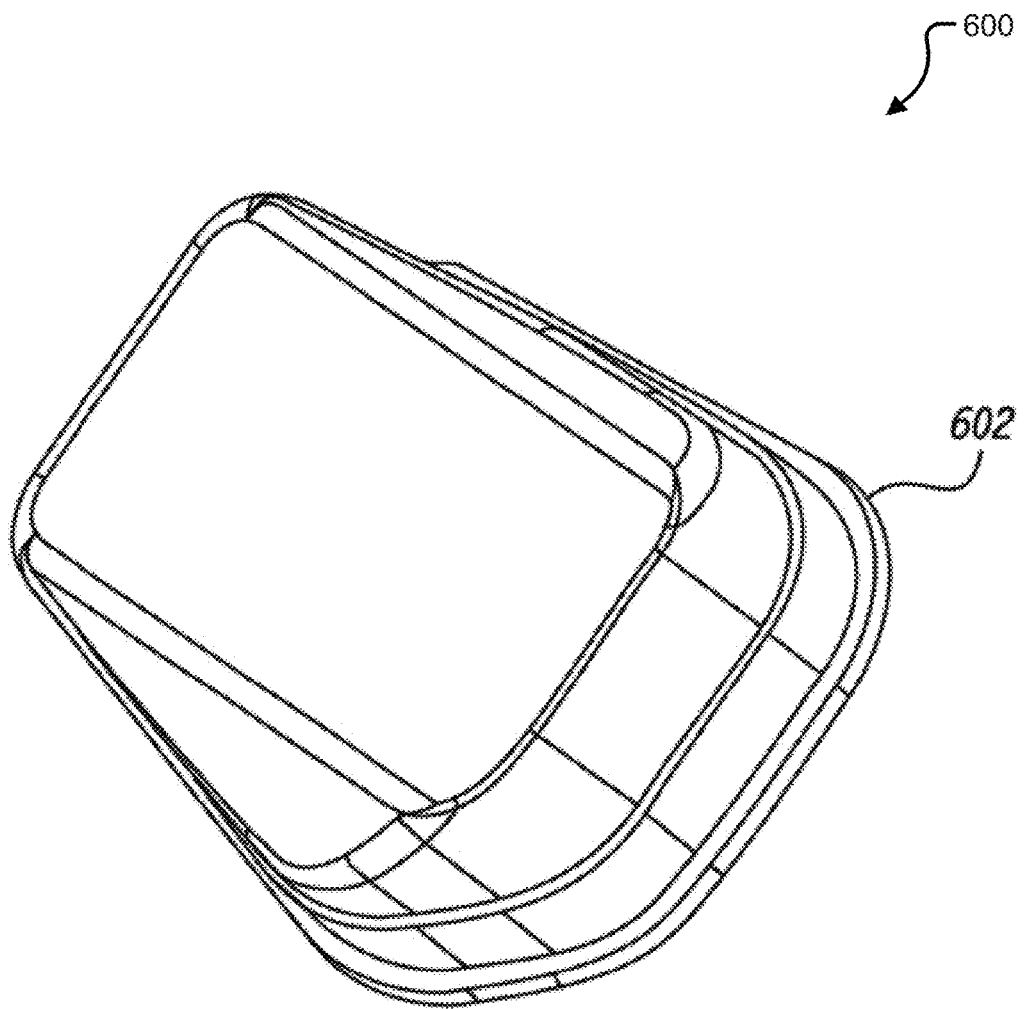

FIGS. 20 and 21 show perspective views of external housing case 600, including a case body 602. In various embodiments, internal housing case 500 and external housing case 600 can be formed from metal, such as aluminum, steel, or the like. Each of internal housing case 500 and external housing case 600 can be machined from a single block, or can be formed by stamping and machining.

Figure 22:
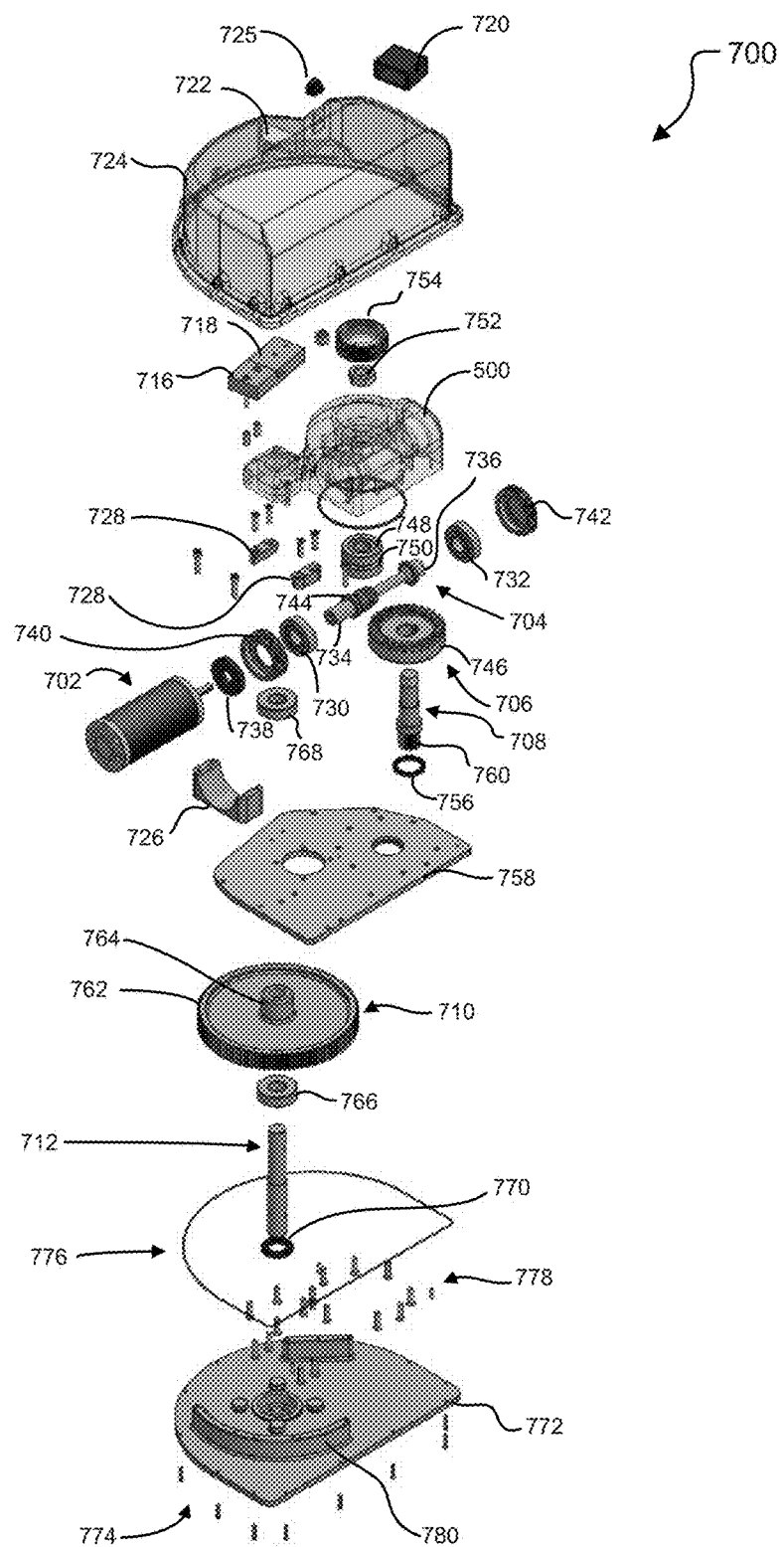
FIG. 22 is an exploded vie of an alternate embodiment of the gear motor.
Figure 23:
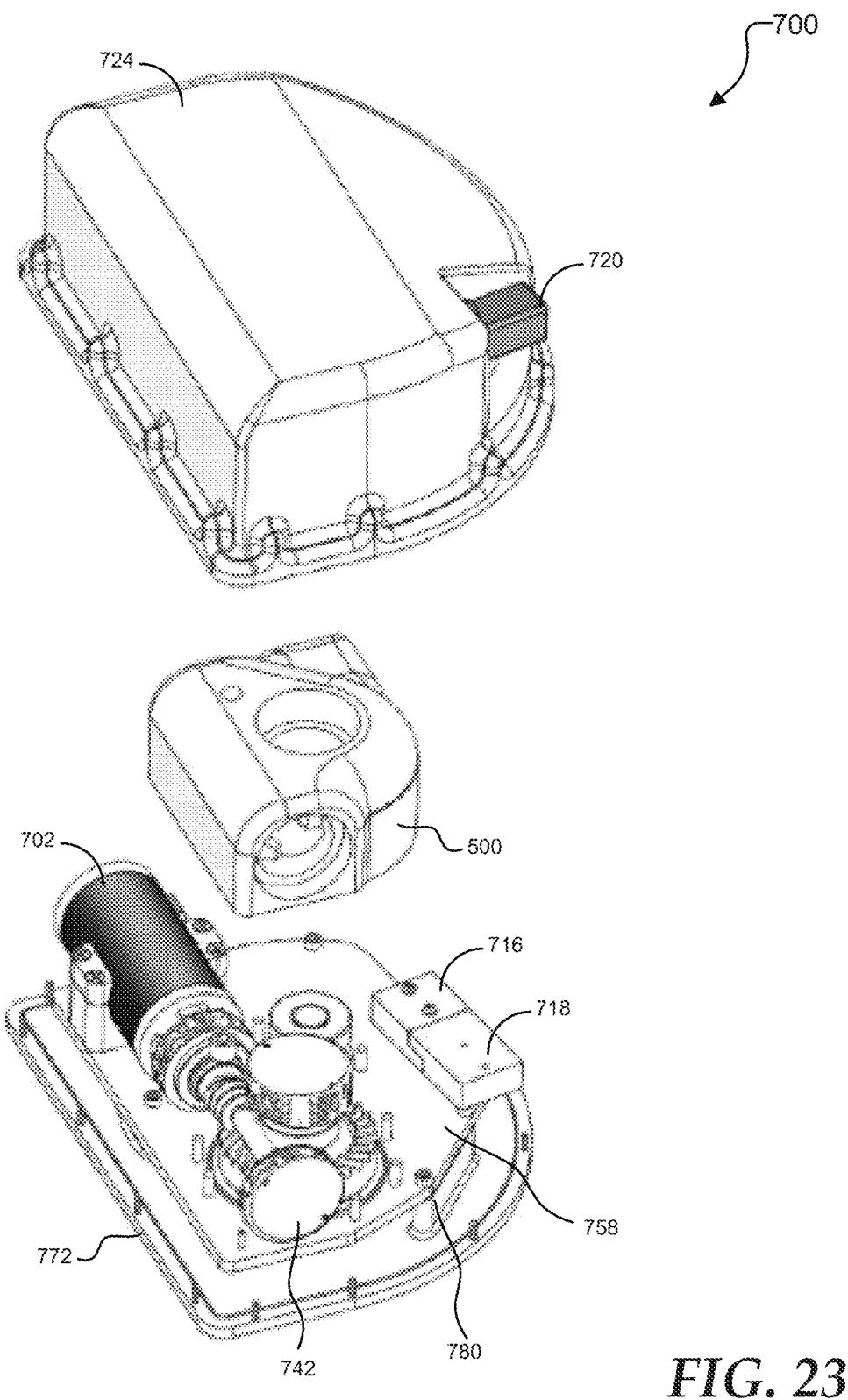
FIG. 23 is a perspective view of the gear motor shown in FIG. 22.

FIGS. 22 and 23 show an alternate embodiment 700 of the gear motor. The gear motor 700 includes an electric motor 702, a pinion shaft 704, a ring gear 706, a ring gear shaft 708, an output gear 710, and an output shaft 712. The electric motor 702 may be a field wound motor or a permanent magnet motor as shown. In one embodiment, the electric motor 702 is a direct current motor that provides seventy ounce-inches of torque at 12,000 rpm, and free runs at 19,000 rpm. Such a motor is available from Chiaphua Components Limited of Hong Kong.

The electric motor 702 receives power from a pair of wires that run to a connector 716. Connector 716 mates with connector 718 that is disposed within a molded, waterproof plug 720. Plug 720 is friction fit within an opening 722 in external housing case or cover 724. From the connector 718, the wires can run to a solid state controller that can operate the electric motor 702 in any desired manner, including forward or reverse. An expanded polytetrafluoroethylene plug 725 inhibits moisture from penetrating inside the cover 724, while still allowing the interior to vent to atmosphere.

The electric motor 702 is disposed between a receiver 726 and a pair of clamps 728. The shaft of the motor 702 extends axially into a bore in the pinion shaft 704 to fix those components relative to each other. Tapered roller bearings 730 and 732 are disposed on respective regions 734 and 736 of the pinion shaft 704. An oil seal 738 and an adjusting nut 740 are disposed between the motor 702 and the bearing 730, and an adjuster 742 is disposed adjacent to the distal end of the pinion shaft.

A single tapered hypoid tooth 744 on pinion shaft 704 engages hypoid teeth 746 on the ring gear 706. The arrangement of the tapered hypoid pinion with an axis skew to that of the ring gear is known as a spiroid gear. The ring gear shaft 708 extends through a bore in the ring gear 706, and has a key slot that accepts a woodruff key to fix the ring gear shaft with respect to the ring gear. One end of the ring gear shaft 708 accepts tapered roller bearings 748 and 750, and extends through internal housing case 500. A nut 752 and an adjuster 754 are disposed on the end of the ring gear shaft. As above, rotation of the pinion adjuster 742 and/or the ring gear adjustor 754 makes minor adjustments in the respective positions of the pinion shaft 704 and the ring gear shaft 708 to optimize contact between the pinion and the ring gear.

In one embodiment, the hypoid tooth 744 has 10 diametrical pitch, a high pressure angle of 30° and a low pressure angle of 10°, a sigma of 40°, a conical lead pitch of 5.43 mm, a face angle of 5°, an offset above center of 25.40 mm, a working depth of 4.60 mm, and a lead angle of 6" 37'. The ring gear 706 may have thirty teeth with a diametrical pitch of 10, a shaft angle of 90°, a pressure angle of 20°, a working depth of 4.31 mm, a whole depth of 4.80 mm, a pitch circle diameter of 76.20 mm, and an outside diameter of 76.20 mm. The 30:1 ratio between the pinion 704 and the ring gear 706 allows that spiroid combination to self lock when the power is turned off to the motor.

The opposite end of the ring gear shaft 708 accepts an oil seal 756, and extends through a center plate 758 that is preferably extruded aluminum. Teeth 760 on the end of the shaft 708 engage teeth 762 on the output gear 710. In one embodiment, fourteen teeth 760 are provided with a twenty pitch. One hundred twenty teeth 762 are provided with a similar pitch. The teeth 760 and 762 can be either straight or helical, as long as they are the same.

The output gear 710 has a collar 764 that extends through the center plate 758. The output shaft 712 extends through a bore in the output gear and accepts roller bearings 766 and 768 on either side of the output gear. An oil seal 770 is disposed around the output shaft 712, and seats in a die cast and machined aluminum bottom plate 772. A plurality of fasteners 774 around the perimeter of the bottom plate secure a seal 776 against the cover 724, while another set of fasteners 778 secure the center plate 758 to the internal housing case 500. In operation, the gear motor may achieve an overall reduction ration in excess of 250:1, and preferably on the order of about 257:1.

The aluminum case 500 and plates 758 and 772 act as heat sinks. Raised spacers 780 extend from the bottom plate 772 and support the centerplate 758, thereby forming space through which air may circulate, either passively by natural convection or actively by forced means. A similar space above the centerplate 758 and between the exterior of the case 500 and the interior of the cover 724 permits a similar airflow.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A gear motor comprising:
    an electric motor;
    a spiroid gear set comprising a high ratio hypoid ring gear and pinion coupled to the motor;
    at least one set of spur gears to couple to and work with the spiroid gear set to transfer power to an output shaft; and
    a pinion adjuster operable to adjust the positioning of the pinion along a pinion axis by rotation of the pinion adjuster.

2. The gear motor of claim 1, further comprising a ring gear adjuster operable to adjust the positioning of the ring gear along a ring gear axis.

3. The gear motor of claim 1, wherein the high ratio hypoid ring gear and pinion are self locking in both directions.

4. The gear motor of claim 1, wherein the output shaft is orthogonal to a motor shaft of the electric motor.

5. The gear motor of claim 1, wherein the electric motor is a direct current powered electric motor.

6. The gear motor of claim 1, wherein the electric motor is a bidirectional motor operable in a clockwise direction and a counter-clockwise direction.

7. The gear motor of claim 1, wherein the high ratio hypoid ring gear and pinion are enclose in a sealed cavity filled with lubricant.

8. The gear motor of claim 1, wherein the gear ratio of the hypoid ring gear and pinion is 30 to 1.

9. The gear motor of claim 1, wherein an axis of the pinion and an axis of the hypoid ring gear are skew, and the axis of the pinion is not tangential to the hypoid ring gear.

\* \* \* \* \*